US009266081B2

(12) United States Patent
Schwefer et al.

(10) Patent No.: US 9,266,081 B2
(45) Date of Patent: Feb. 23, 2016

(54) DEVICE AND PROCESS FOR CATALYTIC GAS PHASE REACTIONS AND USE THEREOF

(75) Inventors: Meinhard Schwefer, Meschede (DE); Michael Groves, Gevelsberg (DE); Jürgen Fuchs, Dortmund (DE); Rainer Maurer, Schwelm (DE); Rolf Siefert, Rheda-Wiedenbrueck (DE); Bernhard Hündgen, Dinslaken (DE)

(73) Assignee: UHDE GMBH, Dortmund (DE)

( * ) Notice: Subject to any disclaimer, the term of this patent is extended or adjusted under 35 U.S.C. 154(b) by 966 days.

(21) Appl. No.: 12/998,775

(22) PCT Filed: Dec. 1, 2009

(86) PCT No.: PCT/EP2009/008553
§ 371 (c)(1),
(2), (4) Date: Oct. 4, 2011

(87) PCT Pub. No.: WO2010/063448
PCT Pub. Date: Jun. 10, 2010

(65) Prior Publication Data
US 2012/0034148 A1 Feb. 9, 2012

(30) Foreign Application Priority Data

Dec. 2, 2008 (DE) .......................... 10 2008 059 930

(51) Int. Cl.
*B01J 19/00* (2006.01)
*C01B 21/26* (2006.01)
(Continued)

(52) U.S. Cl.
CPC ................ *B01J 8/0285* (2013.01); *B01J 8/008* (2013.01); *B01J 8/025* (2013.01); *B01J 8/0278* (2013.01);
(Continued)

(58) Field of Classification Search
CPC ...... C01B 21/26; C01B 21/267; C01B 21/28; C01C 3/022; B01J 8/008; B01J 8/025; B01J 8/0278; B01J 8/0285; B01J 12/007; B01J 15/005; B01J 19/0013; B01J 19/007; B01J 19/2485; B01J 19/26; B01J 2208/00203; B01J 2208/00212; B01J 2208/00495; B01J 2208/00548; B01J 2208/00716; B01J 2219/00083; B01J 2219/00094; B01J 2219/00119; B01J 2219/00164; B01J 2219/00155; B01J 2219/00245; B01J 2219/32296; B01J 2219/324
USPC ......................................................... 423/237
See application file for complete search history.

(56) References Cited

U.S. PATENT DOCUMENTS 3,931,391 A * 1/1976 Koberstein et al. ........... 423/404
5,266,291 A 11/1993 Drnevich et al. ............. 423/392

FOREIGN PATENT DOCUMENTS

| EP | 0 334 710 A1 | 9/1989 | ............... B01J 19/24 |
| EP | 1 028 089 A1 | 8/2000 | ............... C01B 21/28 |
| WO | WO 2008/148487 A1 | 12/2008 | ................. B01J 8/00 |

OTHER PUBLICATIONS

International Preliminary Report on Patentability, (Mar. 2011).

*Primary Examiner* — David M Brunsman
(74) *Attorney, Agent, or Firm* — Michael W. Ferrell; Ferrells, PLLC; Anna L. Kinney (57) ABSTRACT

Improved reactors for catalytic, exothermic gas phase reactions with, as seen in the flow direction of a feed gas, which contains at least one oxidant and at least one component to be oxidized, an entry zone (1), a reaction zone (2) comprising at least one catalyst (4) and an exit zone (3) for the product gas are described. The reactors, at least in the area of the entry zone (1), have means, for example insulating jackets (6) and/or devices for the transport of cooling agents, which decrease the transport of heat produced in the reaction zone (2) into the entry zone (1) and thus decrease the risks of pre-ignition of the feed gas mixture employed or of the course of undesired side reactions in the entry zone (1) and/or wherein the inner walls of the reactor, at least in the area of the entry zone (1), are elaborated from inert material. The feed gas enters into the entry zone (1) as a homogeneous gas mixture with respect to its substance composition via one or more feed lines (30). The reactors can especially be employed for ammonia oxidation, for example in nitric acid plants, in which transition metal catalysts preferably elaborated in honeycomb form with smaller cross sections than the customarily employed platinum gauzes are used.

25 Claims, 8 Drawing Sheets

(51) Int. Cl.
  C01C 3/02      (2006.01)
  B01J 8/02      (2006.01)
  B01J 8/00      (2006.01)
  B01J 12/00     (2006.01)
  B01J 15/00     (2006.01)
  B01J 19/24     (2006.01)
  B01J 19/26     (2006.01)
  C01B 21/28     (2006.01)

(52) U.S. Cl.
  CPC .............. B01J 12/007 (2013.01); B01J 15/005 (2013.01); B01J 19/002 (2013.01); B01J 19/0013 (2013.01); B01J 19/2485 (2013.01); B01J 19/26 (2013.01); C01B 21/26 (2013.01); C01B 21/267 (2013.01); C01B 21/28 (2013.01); C01C 3/022 (2013.01); *B01J 2208/00203* (2013.01); *B01J 2208/00212* (2013.01); *B01J 2208/00495* (2013.01); *B01J 2208/00548* (2013.01); *B01J 2208/00716* (2013.01); *B01J 2219/00083* (2013.01); *B01J 2219/00094* (2013.01); *B01J 2219/00119* (2013.01); *B01J 2219/00155* (2013.01); *B01J 2219/00164* (2013.01); *B01J 2219/00245* (2013.01); *B01J 2219/324* (2013.01); *B01J 2219/32296* (2013.01)

Figure 8 though in the case of modern burners the distributor fittings consist of stainless steel. In EP-A-1,028,089, in order to avoid N₂O formation, a reflector coated with ceramic is mounted between the gas distributor and the Pt/Rh gauzes.

DEVICE AND PROCESS FOR CATALYTIC GAS PHASE REACTIONS AND USE THEREOF

CLAIM FOR PRIORITY

This application is a national phase entry of International Patent Application No. PCT/EP2009/008553 (International Publication No. WO 2010/063448), filed Dec. 1, 2009, and entitled, "Device and Method for Catalytic Gas Phase Reactions and Use Thereof". International Patent Application No. PCT/EP2009/008553 claims benefit of German Patent Application No. DE 10 2008 059 930.1, filed on Dec. 2, 2008, entitled, "Vorrichtung and Verfahren Für Katalytische Gasphasenreaktionen Sowie Deren Verwendung". The priorities of International Patent Application No. PCT/EP2009/008553 and German Patent Application No. DE 10 2008 059 930.1 are hereby claimed and their disclosures incorporated herein in their entireties.

DESCRIPTION

The present invention relates to improved reactors for catalytic gas phase reactions and processes to be carried out therewith, in particular improved oxidation processes, such as processes for ammonia oxidation, which can be used, for example, as components in the preparation of caprolactam or especially of nitric acid.

When carrying out catalytic gas phase reactions, in many cases reaction heat is released. This can reach the sections of the reactor situated before the reaction zone, for example by heat conduction through the heated reactor walls, by convection mediated by swirling of the reaction gases moving in the countercurrent direction or by heat radiation. As a result of this heat transport, the feed gas can be so strongly heated even before reaching the reaction zone, that undesired side reactions or uncontrolled preliminary reactions occur prior to the reaction zone.

An example of an exothermic gas phase reaction carried out industrially on a large scale is the preparation of nitric acid ("$HNO_3$"). This is in general carried out on the industrial scale according to the Ostwald process by catalytic oxidation of ammonia on platinum/rhodium catalysts. Here, ammonia ("$NH_3$") is very selectively oxidized to nitrogen monoxide ("NO"), which is then oxidized in the course of the further process to nitrogen dioxide ("$NO_2$") and finally reacted with water in an absorption tower to give $HNO_3$. The Pt/Rh catalysts are designed as thin gauzes and spread on a broad area in a burner. Customary dimensions for these gauzes are in the range from 0.5-5 m diameter. The thickness of the gauze packing is customarily a few millimeters to at most 2 centimeters, depending on the number of gauzes employed.

An oxygen- and ammonia-containing mixture flows through the gauzes. The composition of this mixture is controlled by dilution such that it is always kept below the lower explosive limit by a safe interval in order to avoid the danger of an explosion or detonation—even in equipment and lines ahead of the gauzes. In the preparation of nitric acid and in some processes for the preparation of caprolactam, the diluents used are the inert components of the air, especially nitrogen, that is, atmospheric air and ammonia are mixed such that mixtures typically contain approximately 8-12% of ammonia. Due to the exothermicity of the reactions on the gauzes, a temperature in the range of approximately 800° C.-950° C. is established there. Processes for the preparation of nitrogen monoxide and of hydroxylamine sulphate as intermediates in the preparation of caprolactam are also known however, in which ammonia is oxidized catalytically using oxygen and the ammonia/oxygen mixture is treated with steam and thus diluted (cf. for this GB-A-1,139,849 and RU-A-2,127,222).

The hot reaction gas is subsequently cooled in a heat exchanger, in which steam is produced or process gas is heated.

The reason for the chosen catalyst geometry of large diameter with very low height of the gauzes is that the $NH_3$ oxidation must take place with a very low residence time because of possible subsequent reaction of the NO on the one hand and on the other hand because the pressure loss produced by the perfusion of the gauzes and the mechanical stress of the gauzes should be kept as low as possible. Thus the perfusion of the gauzes in industrial $HNO_3$ preparation takes place with relatively low linear velocity, depending on the pressure range in the range, of approximately 0.4-1.0 m/s under atmospheric conditions, of approximately 1-3 m/s under medium-pressure oxidation in the range from 3-7 bar abs, and of approximately 2-4 m/s under high-pressure oxidation in the range from 8-12 bar abs, where the velocity data are to be understood as empty space velocities for the gas heated by the reaction heat. In the case of too rapid an incident flow, the reaction on the Pt/Rh gauzes can moreover die out due to the cooling effect of the entering gas flow ("blow-out" phenomenon).

The lower limit of the incident flow rate for the ammonia/oxygen inert mixture is defined by the flame velocity of a possible thermal ammonia combustion, such that a flashback of the reaction ignited on the catalyst into the free gas space ahead of the catalyst bed is excluded in each case.

In addition to the classical gauze catalysts, the use of base metal catalysts based on transition metal oxides for ammonia oxidation is also described in the scientific and patent literature. These can be employed either on their own or alternatively in combination with Pt/Rh gauzes.

A survey in this regard is found, for example, in Sadykov et al., Appl. Catal. General A: 204 (2000) 59-87. The driving force for the use of base metal catalysts is the saving of noble metals, in particular of platinum. Noble metal catalysts are in fact consumed during ammonia oxidation and must thus be replaced, according to the loading of the gauzes, at intervals of approximately three months up to a year, which causes appreciable costs.

Customarily, the catalysts based on transition metal oxides, as also the Pt/Rh gauze catalysts, are likewise flowed through at relatively low incident flow rates. This is especially necessary here in order not to extinguish the ammonia oxidation again, once ignited on the catalysts. Catalysts based on transition metal oxides are in fact generally less active than noble metal catalysts and in comparison to these have a markedly higher starting temperature and a higher extinguishing temperature.

In WO-A-99/25,650, measures are described as to how the "blow-out" temperature can be lowered by the use of very fine-grain catalyst pellets, which are accommodated in "cartridges", without allowing the pressure loss to increase too far here.

In the case of the catalytic oxidation of ammonia, there is moreover always the problem that ammonia ignites before contacting with the actual oxidation catalyst, e.g. on hot pipe walls, and ignites non-selectively here to give $N_2$ and $H_2O$, or alternatively $N_2O$.

It is described in EP-A-1,028,089 that by reflection of the ammonia combustion on distributor fittings for the supply of the $NH_3$/air mixture heating of these fittings can occur, whereby a part of the entering $NH_3$ is oxidized to $N_2O$ on the surface of these fittings.

U.S. Pat. No. 5,266,291 describes a reactor that has a packing of inert material in the entry zone—therein called the mixing zone. In the mixing zone, a cooling medium, e.g. water, can be sprayed in to lower the temperatures in the mixing zone. Alternatively or additionally, the reactor jacket in the mixing zone can be cooled with water. That document further describes the possibility that the reaction zone can also be surrounded with a cooling jacket and that water can also be injected into the reaction zone to lower the temperature therein and in this way to decrease the risk of uncontrolled reactions. In the reactor, different streams of gas are fed into the mixing zone, which mix in the packing present there and are then fed to the reaction zone. In addition to the function as a mixer, the packing also prevents the occurrence of explosions.

EP-A-334,710 describes a reactor that is constructed of a steel wall. This is provided on the inside of the reactor with a coating of refractory concrete and this in turn is covered on the inside by a sheath of mullite. These measures are provided in order to be able to perform the gas phase reactions under high pressure. The reactor shown in that document likewise has a packing and two feed lines for the introduction of different feed gases in the entry zone—therein called the dispersion zone. In this reactor, different streams of gas are also introduced into the dispersion zone, which mix in the packing present there and are then fed to the reaction zone. In addition to the function as a mixer, the packing here also prevents the occurrence of explosions.

The problem of the $NH_3$ pre-ignition is especially of importance in the technically relevant, high $NH_3$ concentrations of 8-12% by volume, since here the combustion itself can be maintained and even increased by the exothermicity of the reaction.

In addition to the actual ignition temperature, i.e. the critical surface temperature above which $NH_3$ decomposition can occur, the removal of the heat released by $NH_3$ decomposition is therefore also of considerable importance.

This removal is all the better, the more rapidly the gas stream laden with ammonia flows over the surfaces (cooling action) and the colder this is. Moreover, the residence time of the feed gas stream before contacting the catalyst and thus the reaction time of the possible non-selective preliminary reaction is reduced.

In the industrial preparation of $HNO_3$ by oxidation of ammonia on Pt/Rh gauzes, the low ignition temperature of the highly active Pt/Rh catalysts makes possible a relatively low inlet temperature of about 200° C. In this way, ammonia pre-ignition, despite the low entry velocities, is no barrier to the industrial realization of the process.

When using catalysts having lower catalytic activity, however, it is necessary to work at higher temperatures (preheating) of the feed gas mixture or with lower inflow velocities or preferably with a combination of both measures. Under these conditions, the risk of ammonia pre-ignition increases.

Experiments with honeycomb catalysts, which in comparison to the platinum gauzes have a lower cross-section and a greater depth of the catalyst bed, have now shown that the selectivity of formation of the desired $NO_x$ at low entry velocities of the feed gas mixture is only very small. The economy of such a process is thus placed in question. This effect could theoretically be compensated by increasing the inflow velocity of the feed gas mixture. In practice, however, an increase in the inflow velocities sets limits, as a disproportionate increase in the pressure loss occurs and moreover, under certain circumstances, only an incomplete reaction of the ammonia is achieved.

In other industrially operated exothermic gas phase reactions, such as, for example, oxidation reactions other than ammonia oxidation, epoxidations or free-radical halogenations of hydrocarbons, the same problems exist in principle.

The object of the present invention is the provision of a reactor and of a process for carrying out catalytic, exothermic gas phase reactions, in which the risks of pre-ignition of the feed gas or feed gas mixture employed or of the occurrence of undesired side reactions are lowered.

The present invention relates to a reactor for catalytic, exothermic gas phase reactions by conversion of a feed gas, which contains at least one oxidant and at least one component to be oxidized, to give a product gas with, as seen in the flow direction of the feed gas, an entry zone (1), a reaction zone (2) comprising at least one catalyst (4) and an exit zone (3) for the product gas, where a homogeneous gas mixture with respect to its chemical composition is supplied as a feed gas to the entry zone (1) by means of one or more feed lines (3) and at least in the area of the entry zone (1) or in the area of the reaction zone (2) means are provided which lower the transport of reaction heat formed in the reaction zone (2) into the entry zone (1) and/or in which the inner walls of the reactor, at least in the area of the entry zone (1) or in the area of the reaction zone (2), are formed from inert material.

Feed Gas and Feed Line (30)

"Feed gas" or "feed gas mixture" is to be understood in the context of this description as meaning a gas mixture that consists of a number of chemical substances, of which at least one reacts in the desired manner in the reaction zone (2) of the reactor according to the invention with formation of one or more desired products, where the additional formation of undesired by-products is not excluded and which contains at least one oxidant and at least one component to be oxidized. The feed gas contains a number of chemical substances that react with one another in the desired manner in the reaction zone (2), namely at least one compound to be oxidized, such as ammonia, and at least one oxidizing compound, such as oxygen, preferably one or more substances inert with respect to the substances reacting with one another likewise being contained in the feed gas. Particularly preferred as inert components are the constituents of the air apart from oxygen, especially nitrogen. The inert component or the inert components serve, by dilution of the chemically active substances, to safely keep below any possible lower explosion limit and thus to eliminate the danger of an explosion in the feed line (30), the entry zone (1) or the reaction zone (2). A further object that is fulfilled by the inert component(s) if required is to modify the velocity of the reactions taking place in the reaction zone in order to avoid catalyst damage by local overheating, or to reduce the temperature increase in the reaction zone (2) by the additional heat capacity of the inert components in order to prevent an impermissible temperature increase due to the exothermicity of the reactions, which otherwise could lead to harmfully high temperatures in the reactor parts or catalysts.

It is characteristic of the feed gas or feed gas mixture that it is already so far homogenized, i.e. materially intermixed, before or at the latest on entry into the entry zone (1), as is necessary for the successful carrying out of the desired reaction or reactions in the reaction zone (2).

This takes place in an apparatus arranged upstream of the feed line(s) (30). Alternatively to this, the intermixing of the substances can take place immediately before the introduction into the entry zone (1). In most cases, the necessary intermixing is achieved if the local concentrations in the feed gas of the substances reacting with one another in the reaction zone have variation coefficients of ≤0.1, preferably less than 0.05, particularly preferably less than 0.03. The carrying out of the intermixing or the apparatus which is necessary for this and appropriate measures are known to the person skilled in the art. Such apparatuses for intermixing are, for example, static mixers. In these apparatuses, the gases to be intermixed are led into a channel, in which fixed sheets of metal, pipes or other shapes are installed, which lead to a good intermixing of the gases through the turbulence produced by gas flow therethrough. Further examples of apparatuses for mixing are dynamic mixers. Such apparatuses contain one or more movable elements. The movement is customarily caused by electrical energy. The movement leads to turbulence, which leads to the good intermixing of the entering gases.

The variation coefficient of the local concentrations of a substance means the ratio of the standard deviation of the local substance concentrations to the mean value of the local substance concentrations. The substance concentration can be indicated, for example, in mol/m$^3$, kg/liter, ppm or other concentration units. Since the variation coefficient comprises the ratio of the concentrations, it is dimensionless and independent of the concentration unit chosen. The variation coefficient is a customary measure of the quality of a mixture or of the efficiency of a mixing apparatus. The weighted variation coefficient of the local concentrations achieved in a channel or pipe can be determined, for example, by means of the local concentrations and gas velocities, which are determined by sampling or pitot tube measurement of an adequate number of measuring points well distributed over the cross-section of the channel or pipe. The variation coefficient of the local substance concentrations to be expected can also be predicted mathematically. Suppliers of mixing apparatuses customarily indicate the variation coefficients of the substance concentrations to be expected with their apparatuses, which they have determined mathematically or by experiments.

Entry Zone (1)

Entry zone (1) is understood in the context of the present description as meaning the inner space of the reactor that is situated between the at least one feed line (30) for the introduction of the materially intermixed feed gas or of the feed gas mixture and the reaction zone (2). This is generally an empty space. However, this can also contain functional fittings, such as flow-control devices, which do not serve for intermixing, i.e. cause possible intermixing only as an additional secondary effect. Examples of functional fittings are fittings for the equalization of the gas flow over the cross-section of the entry zone, such as, for example, baffle plates or turning vanes, perforated plates, wire mesh, lamellae or flow rectifiers. Further possible functional fittings are measuring devices, such as, for example, sampling probes or instruments for the measurement of pressure or pressure distribution. Further possible functional fittings are fittings for cooling or heating the gas mixture by heat exchange with other media that flow through pipes or other channels built into the entry zone. Further possible functional fittings are electrical heating elements, with which the gas mixture is heated. Further possible functional fittings are ignition devices for starting the catalytic reaction. Further possible functional fittings are blowers for increasing the pressure of the gas mixture. Further possible functional fittings are turbines for the recovery of energy from the gas mixture. A combination of two or more of these functional fittings can also be employed. Suitable ignition devices can produce sparks piezoelectrically or inductively or they produce a high temperature thermoelectrically. Sufficient energy is thereby generated in the entering gas mixture in order to initiate the catalytic reactions. The energy can also be indirectly transferred to the gas mixture by first feeding only the oxidant and optionally the inert substances to the reactor and leading a readily ignitable gas (here called "ignition gas"), such as, for example, hydrogen through a separate feed line into the ignition device and igniting it. The flame of the burning ignition gas from the ignition device heats the catalyst to the necessary reaction temperature. Subsequently, the component(s) of the gas mixture to be oxidized is/are additionally fed to the reactor. If the catalytic reactions desired have begun, the supply of the ignition gas is ended.

Since the feed gas is already well intermixed before or on entry into the entry zone (1), fittings for mixing can be dispensed with in the entry zone (1). In particular, no inert packings for mixing or dispersion are necessary.

Characteristic of the entry zone (1) and for differentiation from the term "feed line" (30) or "feed lines" (30) is that without the use of one or more of the measures described here for decreasing the transport of heat formed in the reaction zone (2) from the reaction zone (2) into the entry zone (1), conditions could occur that could lead to undesired side reactions or pre-ignition in the entry zone. The feed line (30) or feed lines are to be considered as so far removed from the reaction zone (2) that this has no or a negative influence to be neglected on the feed lines.

Reaction Zone (2)

Reaction zone (2) in the context of the present description is to be understood as meaning the inner space of the reactor that follows the entry zone (1) and that contains one or more catalysts for the exothermic gas-phase reaction. In the reaction zone (2), the major part of the reactions between the components of the feed gas mixture takes place. The type of positioning of the catalyst is performed by the person skilled in the art according to known criteria. Customarily, the catalyst will be arranged in the form of packings, pourings, gauzes or honeycombs.

It is not obligatory that the entry zone (1) is only spatially separated from the exit zone (3) by the reaction zone (2). Rather, the entry zone (1) and exit zone (3) can additionally be separated by a wall or a support for the catalyst and for other fittings in the reaction zone (2). The wall or the support of the reaction zone (2) must only reliably prevent feed gas flowing from the entry zone (1) directly into the exit zone (3) with avoidance of the reaction zone (2). The side of the wall or support of the reaction zone (2) facing the entry zone (1) is included in the entry zone (1), which the side of the exit zone (3) facing the exit zone (3).

The reaction zone (2) can thus fill the entire cross-section of the reactor according to the invention or alternatively only a part thereof. In the latter case, the entry zone (1) changes directly into the exit zone (3) in the part of the reactor cross-section that is not filled by the reaction zone (2).

Exit Zone (3)

Exit zone (3) in the context of the present description is to be understood as meaning the inner space of the reactor that follows the reaction zone (2) and in which the product-containing gas mixture is led off from the reactor. This is generally likewise an empty space. However, this can also contain functional fittings, such as devices for holding the catalyst or devices for heat recovery. Further reactors or after-reactors can follow in the exit zone.

Means for Hindering the Back-Transport of Heat

The feed gas reacts in the reaction zone (2) completely or partially in an exothermic reaction with formation of the product gas, which subsequently leaves the reactor through the exit zone (3). There is the risk that the heat produced in the reaction zone (2) is transported into the entry zone (1) at least partially against the flow of the feed gas by conduction, convection and/or radiation and the feed gas or the surface of the reactor wall in the entry zone (1) is heated there in an unjustifiable manner.

In order to prevent this or at least to hinder it, according to the invention in a first embodiment of the invention at least in the area of the entry zone (1) or the reaction zone (2) means are provided which decrease the transport of heat produced in the reaction zone (2) into the entry zone (1).

In the area of the entry zone (1) or in the area of the reaction zone (2) or in the area of the entry zone (1) and the reaction zone (2) or in the area of the entry zone (1) and the exit zone (3) or in the area of the entry zone (1), the reaction zone (2) and the exit zone (3) the reactor according to the invention preferably has means which decrease the transport of heat produced in the reaction zone (2) into the entry zone (1).

As means for decreasing the transport of heat formed in the reaction zone (2) into the entry zone (1), different solution approaches can be used.

In one embodiment, in the area of the entry zone (1) or in the area of the entry zone (1) and the reaction zone (2) or in the area of the entry zone (1) and the exit zone (3) an insulating jacket (6) is provided which insulates the inner space of the reactor against the reactor jacketing (5). This insulating jacket (6) essentially acts in two ways. Heat that passes along the thermally readily conductive reactor jacketing (5) from the reaction zone (2) or from the exit zone (3) into the entry zone (1) can only be transported with difficulty through the poorly heat-conducting insulating jacket (6) to the surface facing the feed gas. Moreover, the direct heat conduction along the insulating jacket (6) from the reaction zone (2) or the exit zone (3) into the entry zone (1) is reduced as a result of the low heat conductivity of the insulating jacket (6).

In a second embodiment, a device for passing a cooling medium through is provided in the area of the entry zone (1) or in the area of the entry zone (1) and the reaction zone (2) or in the area of the entry zone (1) and the exit zone (3). This device partially absorbs the heat produced in the reaction zone (2) such that this heat is no longer available for heat transport into the entry zone (1) and/or such that this heat is transferred into the feed gas in a position of the entry zone (1), in which this is still so cool that a temperature increase produced by the introduction of the cooling medium is uncritical; or the cooling medium cools the entry zone (1) adjacent to the reaction zone (2) or to the exit zone (3) so strongly that the temperature of the entry zone (1) remains in the uncritical range despite the heat transferred from the reaction zone (2). A reactor with a combination of both measures is particularly preferred.

In a further preferred embodiment, in the reactor according to the invention means are provided at least in the area of the entry zone (1) or in the area of the reaction zone (2) which decrease the transport of the heat produced in the reaction zone (2) into the entry zone (1) and the inner walls of the reactor, at least in the area of the entry zone (1) or in the area of the reaction zone (2), are formed from inert material.

Inert Materials

In a further embodiment of the invention, the inner walls of the reactor, at least in the area of the entry zone (1) or in the area reaction zone (2), are formed from inert material. This embodiment prevents or hinders the catalytic reaction of the feed gas on the reactor inner walls. Forming the reactor inner walls of inert materials can be carried out, for example, by a coating or the inert materials are present in the reactor in the form of sheaths. The reactor walls themselves can also consist of inert materials.

The reactor according to the invention is preferably elaborated from inert material in the area of the entry zone (1) or in the area of the reaction zone (2) or in the area of the entry zone (1) and of the reaction zone (2) or in the area of the entry zone (1), of the reaction zone (2) and of the exit zone (3).

The term "inert material" is to be understood in the context of this description as meaning all materials which do not promote any undesired side reactions at the temperatures prevailing in the feed gas in the entry zone (1) or at the temperatures on the surfaces of the reactor inner wall, preferably the inner wall of the entry zone (1). These materials can additionally decrease the heat transport from the reaction zone (2) or the exit zone (3) into the entry zone (1). Inert and thermally insulating materials are a preferred embodiment.

Examples of inert materials are ceramics, in particular tightly sintered ceramics, and furthermore quartz glass, chamotte, enamel and materials with passivated and/or polished surfaces, for example metals with passivated and/or polished surfaces. Passivation can be brought about, for example, by treatment with acids, alkalis or salt solutions.

The invention also relates to a process for carrying out catalytic exothermic gas phase reactions using the reactor described above.

The process has the following measures:
i) introduction of at least one homogeneous gas mixture with respect to its chemical composition, which contains at least one oxidant and at least one component to be oxidized, as a feed gas through at least one feed line (30) into an entry zone (1) of a reactor,
ii) supply of the feed gas from the entry zone (1) into a reaction zone (2) comprising a catalyst (4) under conditions where the feed gas reacts completely or partially in an exothermic reaction in the reaction zone (4) to give a product gas,
iii) leading off of the product gas through an exit zone (3) from the reactor, and
iv) provision of means for decreasing the transport of reaction heat generated in the reaction zone (2) into the entry zone (1) and/or forming the inner walls of the reactor, at least in the area of the entry zone (1) or in the area of the reaction zone (2), from inert material.

Examples of chemical reactions that can be carried out in the reactor according to the invention or using the process according to the invention are oxidation reactions of all types, including exothermic free-radical gas-phase reactions, such as halogenation reactions.

Preferably, the reactor according to the invention or the process according to the invention is employed for the oxidation of ammonia, in particular for the preparation of caprolactam and nitric acid.

Likewise, the reactor according to the invention or the process according to the invention is preferably employed for carrying out the Andrussow reaction, in particular for the preparation of hydrogen cyanide from ammonia, oxygen and hydrocarbons, preferably methane.

In the following description, the oxidation of ammonia for nitric acid preparation is shown in more detail by way of example as a model reaction. In principle, the reactor and process according to the invention—as explained above—are also suitable, however, for other reactions.

Catalysts that can be employed are all catalysts suitable for the target reaction or target reactions concerned. These can be used, for example, in massive form as full or supported catalysts. All customary catalyst geometries can also be used, for example pellets, granules, extrudates or powders in the form of particulate beds, packings, gauzes or other forms, such as, for example, in the form of monolithic honeycomb bodies.

Catalysts preferably employed contain appreciable amounts, e.g. at least 30% by weight, of oxides, preferably of metal oxides, especially of transition metal oxides.

According to the invention, transition metal oxide-containing catalysts can in particular be employed here, such as are described, for example, in Appl. Catal. General A: 204 (2000) 59-87, in U.S. Pat. No. 5,690,900 or in EP-A-946,290.

Cobalt-containing catalysts are particularly suitable. As a structural type, perovskites are especially advantageous.

Preferably, according to the invention catalysts are employed in honeycomb form for the ammonia oxidation. These can be present, for example, as honeycombed massive catalysts or supported in the form of honeycombed carriers, on which and/or in which is incorporated catalytically active material.

Catalysts are particularly preferably employed, for example in the form of particulate beds, packings or honeycombs, which seen in the flow direction have a depth of at least 3 cm, preferably at least 5 cm, in particular at least 10 cm and very particularly preferably 10 to 200 cm.

BRIEF DESCRIPTION OF THE DRAWINGS

The following examples and figures illustrate the invention without restricting this thereby. The figures show.

DETAILED DESCRIPTION

The figures are described in detail in the following examples.

Example 1

Figure 1:
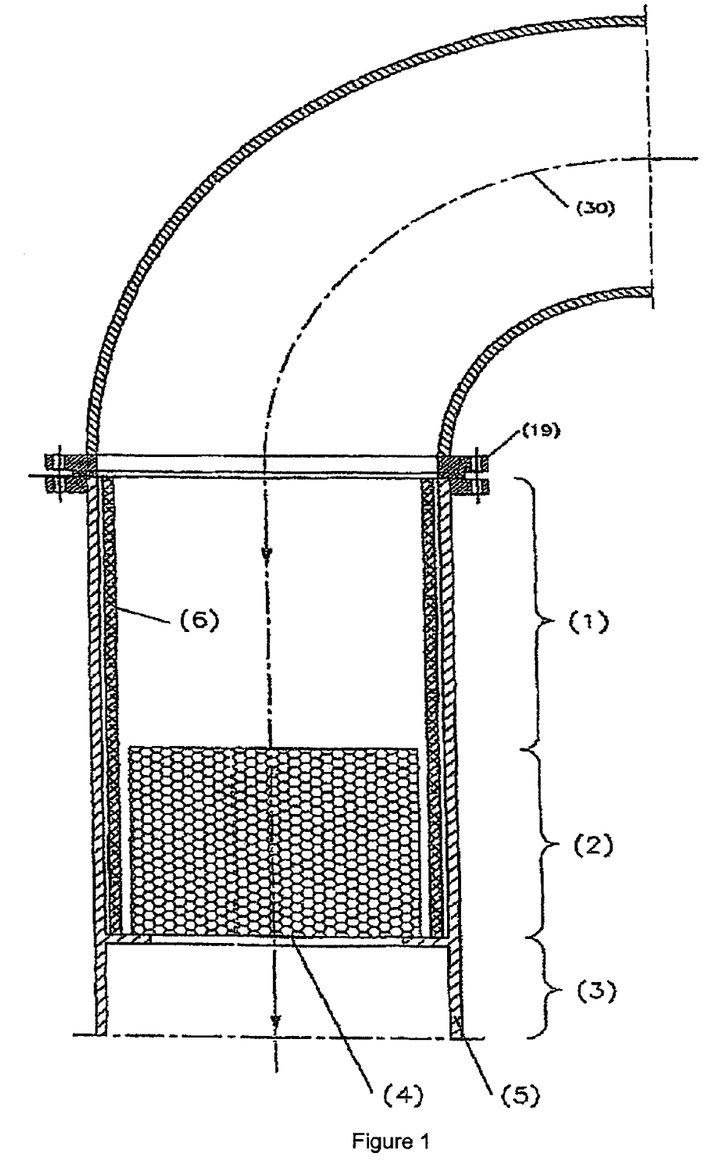
FIG. 1: A device according to the invention in longitudinal section.

The principal features of the invention are illustrated in FIG. 1 by means of an ammonia oxidation device according to the invention.

An ammonia oxidation device can be divided into three zones, namely into an entry zone (1), into a reaction zone (2) and into an exit zone (3).

The well-intermixed ammonia/oxygen/inert-containing gas mixture ("feed gas mixture" below) is introduced into the entry zone (1) via feed line (30) and contacts the ammonia oxidation catalyst (4) in the reaction zone (2) subsequent thereto. Subsequently, the product gas mixture of the oxidation reactions leaves the reaction zone (2) through the exit zone (3). Entry zone (1) is an empty space in this embodiment and contains no packing of inert material.

In the embodiment shown in FIG. 1, all three zones (1, 2, 3) of the device according to the invention are surrounded by jacketing (5), which is additionally a carrier for the catalyst (4) and for the insulating jacket (6). The jacketing (5) can itself be the walls of a high-pressure container, or alternatively the jacketing can be accommodated in a space that in turn is itself surrounded by a pressure jacket not shown in FIG. 1.

The insulating jacket (6), which consists of a thermally insulating and gas-tight material, serves for the thermal decoupling of entry zone (1) and reaction zone (2). The insulating jacket (6) prevents or hinders heat reaching the entry zone (1) being transmitted to the feed gas mixture as a result of heat conduction through the jacketing (5) from the reaction zone (2). Although the part of the jacketing (5) situated in the entry zone becomes hotter as a result of the heat conduction of the reaction heat from the reaction zone (2), the transfer of the heat to the feed gas mixture is strongly inhibited by the thermally insulating jacket (6). Since the insulating jacket (6) is only slightly heat-conducting, the insulating jacket (6) also prevents or hinders direct heat transport along the insulating jacket (6) from the reaction zone (2) to the entry zone (1). By suitable choice of materials and thickness of the insulating jacket (6), the temperature of the wall of the insulating jacket (6) facing the feed gas mixture remains below the ignition or reaction temperature of the feed gas mixture, and undesired premature reactions are suppressed.

Example 2

Figure 2:
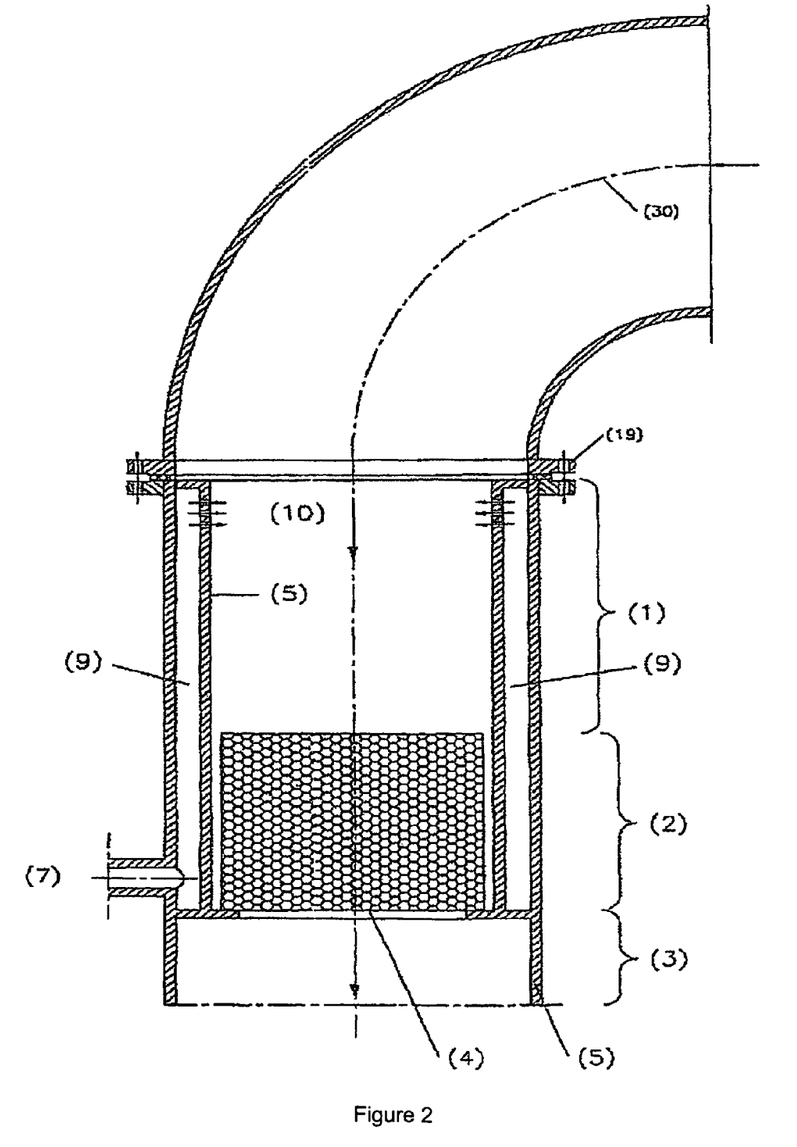
FIG. 2: A further device according to the invention in longitudinal section.

A further possible embodiment of the invention is shown in FIG. 2. Except for the realization of the thermal decoupling between entry and reaction zone (1, 2) this embodiment is similar to the device of Example 1.

An entry zone (1), reaction zone (2) and exit zone (3) are also present in this ammonia oxidation device. Entry zone (1) is also an empty space in this embodiment and contains no packing of inert material.

The well-intermixed ammonia/oxygen/inert-containing gas mixture is introduced into the entry zone (1) via feed line (30). The mixture then meets the ammonia oxidation catalyst (4) in the reaction zone (2). Subsequently, the product mixture of the oxidation reactions leaves the reaction zone (2) through the exit zone (3).

The jacketing (5) of all three zones holds the catalyst (4). The jacketing (5) can itself be the walls of a pressure container, or alternatively the jacketing can be accommodated in a space that in turn is itself surrounded by a pressure jacket (not shown here).

At the level of the entry and reaction zone (1, 2) the jacketing (5) is of double-walled design. At the end of the double wall at the level of reaction zone (2) is attached an inlet (7) for a cooling medium that is compatible with the feed gas mixture, the reactions desired in the reactor, the catalyst (4) and the product gas mixture. For use in nitric acid plants, air, for example, can be employed as a suitable cooling medium.

The cooling medium flows through the space (9) in the double wall and thereby cools the inner wall of the jacketing (5). A thermal decoupling of the entry zone (1) from the reaction zone (2) is thereby realized, since the heat reaching the entry zone (1) as a result of heat conduction through the jacketing (5) from the reaction zone (2) is transmitted to the cooling medium.

By means of a number of small openings (10) at the end of the double wall at the level of the entry zone (1), the cooling medium enters the entry zone (1) and mixes with the feed gas mixture.

By suitable choice of the inlet (7) and openings (10) and by suitable choice of the type, amount, flow velocity and entry temperature of the cooling medium, the temperature in the feed gas mixture and on the inner surface of the jacketing (5)

can be adjusted to be below the ignition or reaction temperature of the feed gas mixture and undesired premature reactions are suppressed.

Example 3

Figure 3:
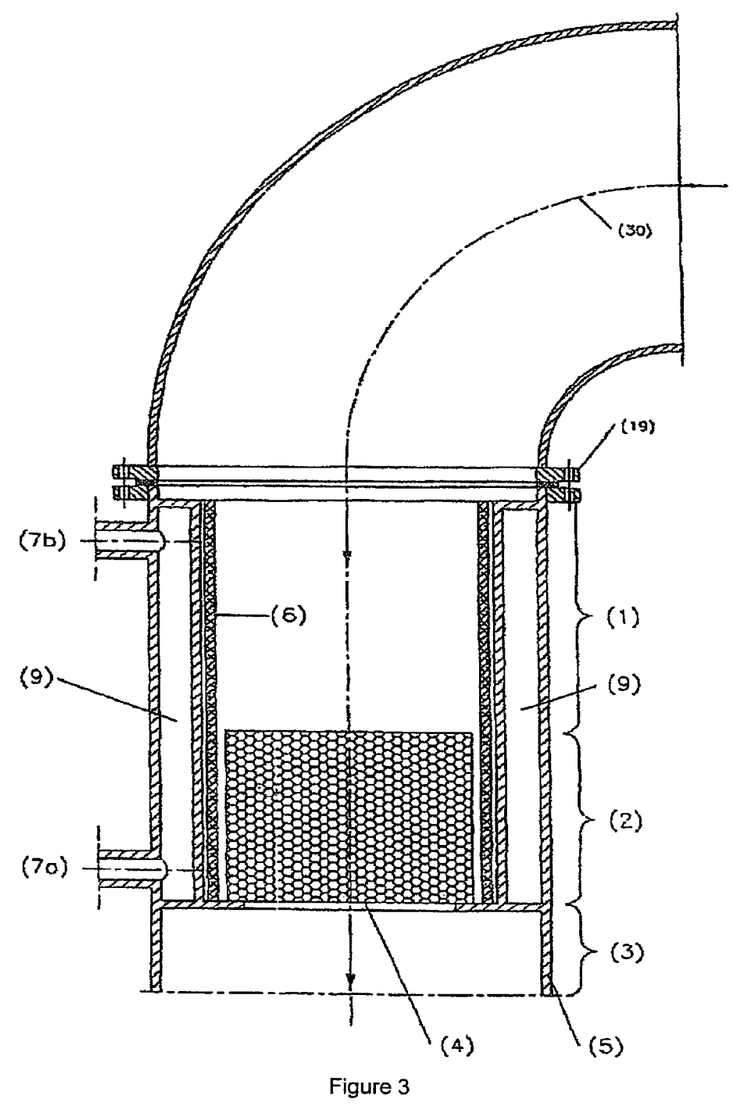
FIG. 3: A further device according to the invention in longitudinal section.

In FIG. 3, a device according to the invention is shown that allows a particularly effective thermal decoupling between entry and reaction zone.

Entry zone (1), reaction zone (2) and exit zone (3) are also present in this ammonia oxidation device. In this embodiment, entry zone (1) is an empty space and contains no packing of inert material.

The well-intermixed ammonia/oxygen inert-containing gas mixture is introduced into the entry zone (1) via feed line (30). The mixture then meets the ammonia oxidation catalyst (4) in the reaction zone (2). Subsequently, the product mixture of the oxidation reactions leaves the reaction zone (2) through the exit zone (3).

The jacketing (5) of all three zones holds the catalyst (4) and the insulating jacket (6). The jacketing (5) can itself be the walls of a pressure container, or alternatively the jacketing (5) can be accommodated in a space that in turn is itself surrounded by a pressure jacket (not shown here).

At the level of the entry and the reaction zone (1, 2), the jacketing (5) is of double-walled design. Connections (7a, 7b) for a cooling medium are also attached there. Suitable cooling media are, for example, water or air. The cooling medium can flow with or against the flow direction of the feed gas mixture. Both the insulating jacket (6) and the impact of a cooling medium on the space (9) between the double walls of the jacketing (5) serve for the thermal decoupling of the entry zone (1) from the reaction zone (2).

The insulating jacket (6) consisting of a thermally insulating material and covering the jacketing (5) at the level of the reaction zone (2) and the entry zone (1) prevents the heat reaching the entry zone (1) by heat conduction through the jacketing (5) of the reaction zone (2) from being transmitted to the feed gas mixture. Since the insulating jacket (6) is only slightly heat-conducting, the insulating jacket (6) also prevents or hinders direct heat transport along the insulating jacket (6) from the reaction zone (2) into the entry zone (1).

The cooling medium flows through the space (9) in the double wall of the jacketing (5) and thereby cools the inner wall of the jacketing (5). A further thermal decoupling of the entry zone (1) from the reaction zone (2) is thereby realized, since the heat reaching the entry zone (1) through the jacketing (5) by heat conduction from the reaction zone (2) is transmitted to the cooling medium. After flowing through the double wall, the cooling medium emerges again from the space (9) between the double walls through one of the connections (7a, 7b).

The action of the insulating jacket (6) is thereby assisted by the cooling by the cooling medium. By suitable choice of the insulating materials and their thickness, and of the cooling medium, the temperature of the wall of the insulating jacket (6) facing the feed gas mixture remains below the ignition or reaction temperature of the feed gas mixture, and undesired premature reactions are suppressed.

Example 4

Figure 4:
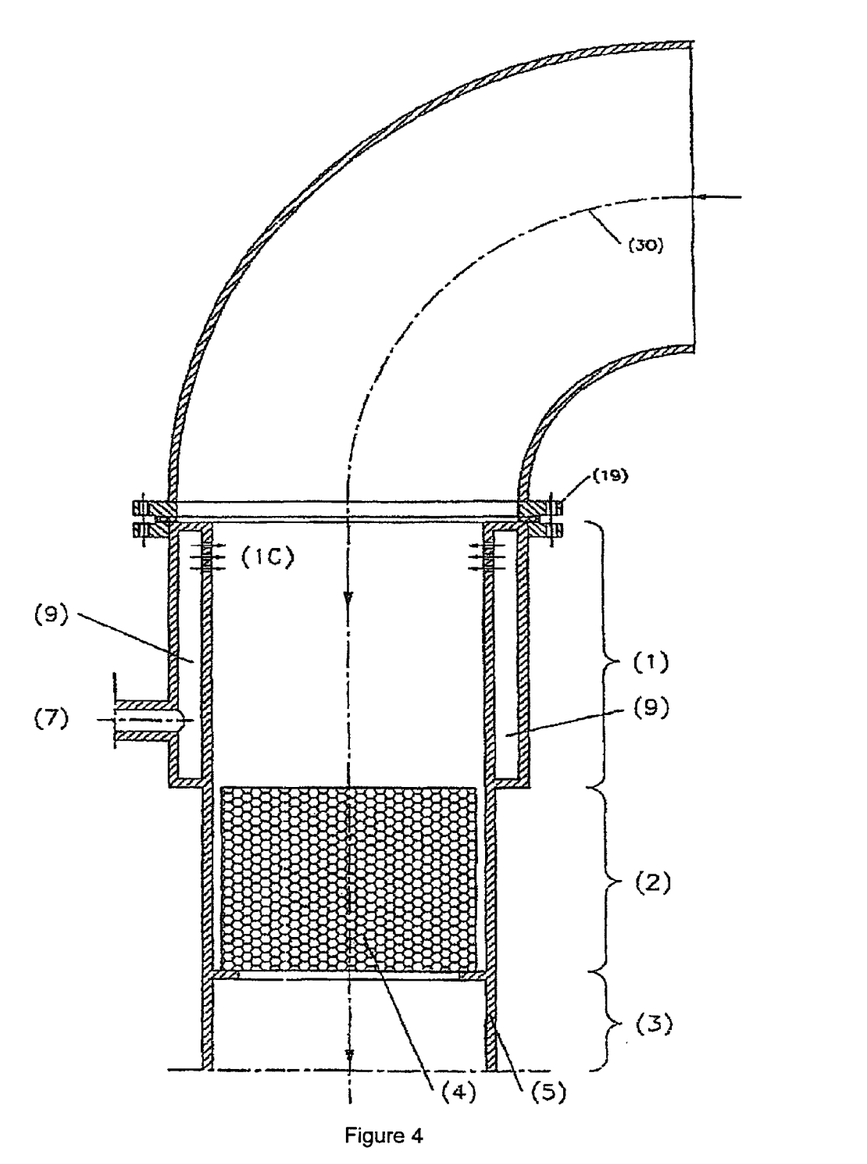
FIG. 4: A further device according to the invention in longitudinal section.

A similar device as in FIG. 2 is shown in FIG. 4. Here, the thermal decoupling between the entry and reaction zone (1, 2) takes place by cooling of the entry zone.

Entry zone (1), reaction zone (2) and exit zone (3) are also present in this ammonia oxidation device. Entry zone (1) is an empty space in this embodiment and contains no packing of inert material.

The well-intermixed ammonia/oxygen inert-containing gas mixture is introduced into the entry zone (1) via feed line (30). The mixture then meets the ammonia oxidation catalyst (4) in the reaction zone (2). Subsequently, the product mixture of the oxidation reactions leaves the reaction zone (2) through the exit zone (3).

The jacketing (5) of all three zones holds the catalyst (4). The jacketing (5) can itself be the walls of a pressure container, or alternatively the jacketing can be accommodated in a space that in turn is itself surrounded by the pressure jacket (not shown here).

At the level of the entry zone (1), the jacketing (5) is of double-walled design. At the end of the double wall in the vicinity of the reaction zone (2) is attached an inlet (7) for a cooling medium that is compatible with the feed gas mixture, the reactions desired in the reactor, the catalyst (4) and the product gas mixture. For use in nitric acid plants air, for example, can be employed as a suitable cooling medium.

The cooling medium flows through the space (9) in the double wall and thereby cools the inner wall of the jacketing (5) at the level of the entry zone (1). A thermal decoupling of the entry zone (1) from the reaction zone (2) is thereby realized, since the heat reaching the entry zone (1) from the reaction zone (2) as a result of heat conduction through the jacketing (5) is transmitted to the cooling medium.

By means of a number of small openings (10) on the end of the double wall located against the flow direction of the feed gas, the cooling medium enters the entry zone (1) and mixes with the feed gas mixture.

By suitable choice of spacing of the inlet (7) and openings (10) and by suitable choice of the type, amount, flow velocity and entry temperature of the cooling medium the temperature in the feed gas mixture and on the inner surface of the jacketing (5) can be adjusted to be below the ignition or reaction temperature of the feed gas mixture and undesired premature reactions are suppressed.

Example 5

Figure 5:
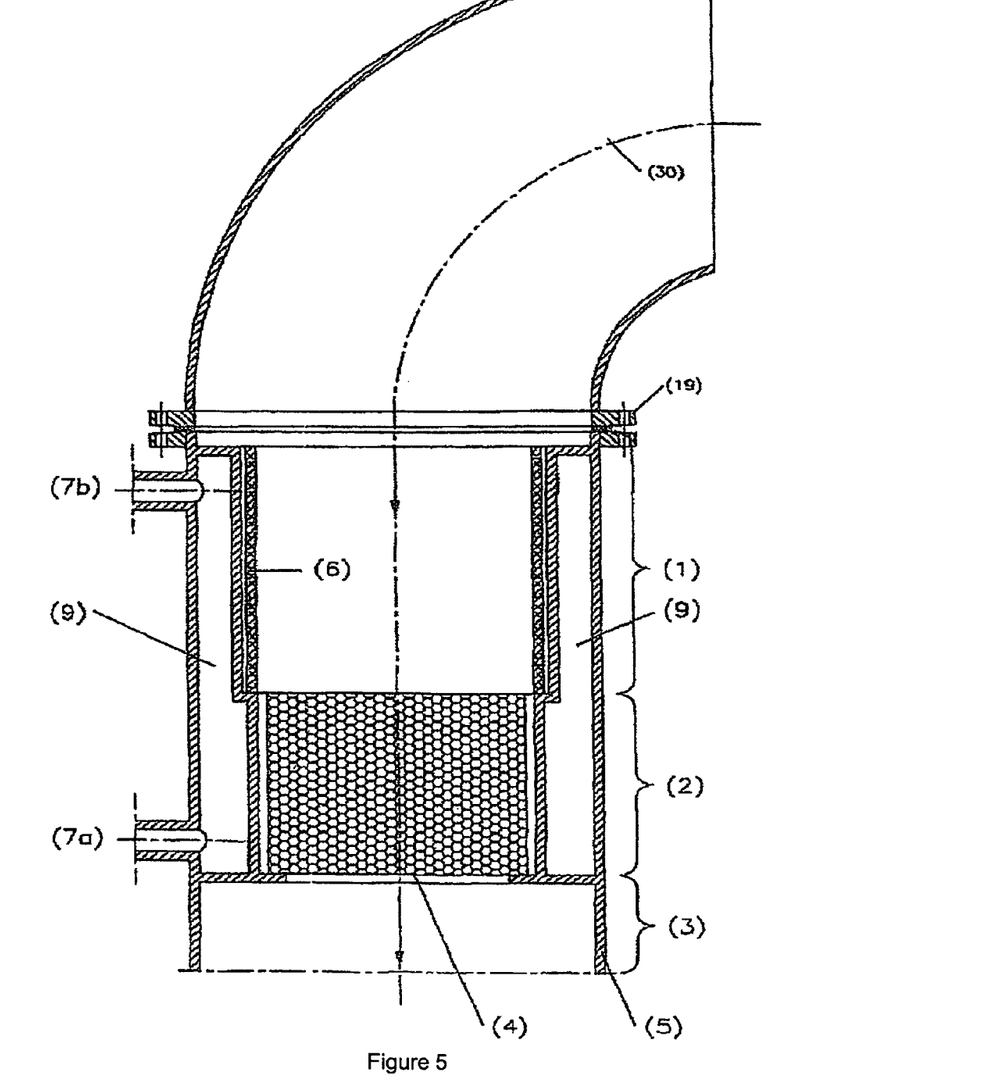
FIG. 5: A further device according to the invention in longitudinal section.

A similar device as in FIG. 3 is shown in FIG. 5. Here, however, the insulating jacket (6) runs only at the level of the entry zone (1).

Entry zone (1), reaction zone (2) and exit zone (3) are also present in this ammonia oxidation device. Entry zone (1) in this embodiment is an empty space and contains no packing of inert material.

The well-intermixed ammonia/oxygen/inert-containing gas mixture is introduced into the entry zone (1) via feed line (30). The mixture then meets the ammonia oxidation catalyst (4) in the reaction zone (2). Subsequently, the product mixture of the oxidation reactions leaves the reaction zone (2) through the exit zone (3).

The jacketing (5) of all three zones holds the catalyst (4) and the insulating jacket (6). The jacketing (5) can itself be the walls of a pressure container, or alternatively the jacketing (5) can be accommodated in a space that in turn is itself surrounded by a pressure jacket (not shown here).

At the level of the entry and reaction zone (1, 2), the jacketing (5) is of double-walled design. Connections (7a, 7b) for a cooling medium are also attached there. The cooling medium can flow in or against the flow direction of the feed gas mixture. Both the insulating jacket (6) and the impact of a cooling medium on the space (9) in the double wall of the jacketing (5) serve for the thermal decoupling of the entry zone (1) from the reaction zone (2).

The insulating jacket (6) consisting of a thermally insulating material and covering the jacketing (5) at the level of the entry zone (1) prevents heat reaching the entry zone (1) from the reaction zone (2) as a result of heat conduction through the jacketing (5) being transmitted to the feed gas mixture. Since the insulating jacket (6) is only slightly heat-conducting, the insulating jacket (6) also prevents or hinders direct heat transport along the insulating jacket (6) from the reaction zone (2) to the entry zone (1).

The cooling medium flows through the space (9) in the double wall of the jacketing (5) and thereby cools the inner wall of the jacketing (5). A further thermal decoupling of the entry zone (1) from the reaction zone (2) is thereby realized, since the heat reaching the entry zone (1) through the jacketing (5) by heat conduction from the reaction zone (2) is transmitted to the cooling medium. After flowing through the double wall, the cooling medium emerges again from the space (9) in the double wall through one of the connections (7a, 7b).

The action of the insulating jacket (6) is assisted by the cooling by the cooling medium. By suitable choice of the insulating materials and their thickness, and of the cooling medium, the temperature of the wall of the insulating jacket (6) facing the feed gas mixture remains below the ignition or reaction temperature of the feed gas mixture, and undesired premature reactions are suppressed.

Example 6

Figure 6:
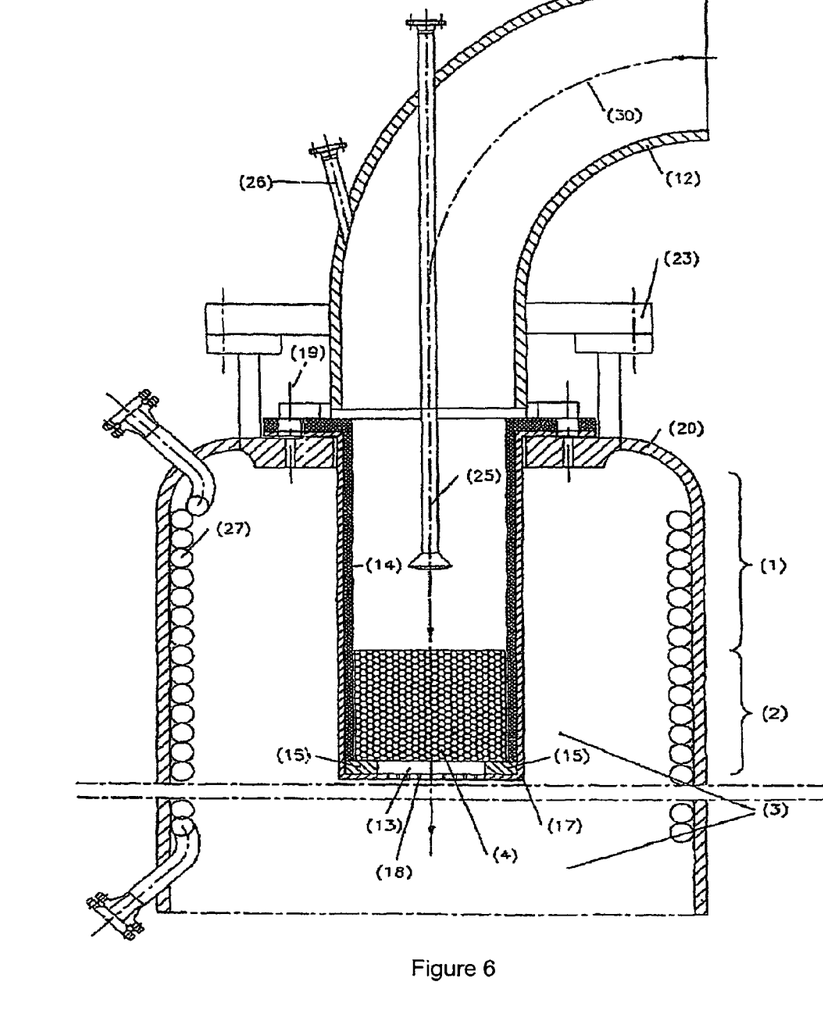
FIG. 6: An ammonia oxidation reactor modified according to the invention in longitudinal section.

This embodiment is mainly suitable for replacing the existing hood of a conventional ammonia oxidation reactor. An ammonia oxidation reactor according to the invention is shown in FIG. 6.

A well-intermixed oxygen/ammonia inert-containing feed gas mixture enters the device via feed line (30). The mixture is led over an ammonia oxidation catalyst (4), which is here of honeycomb design or is situated on and/or in a honeycombed carrier. The ammonia is converted there to nitrogen monoxide by reaction with a part of the oxygen in the feed gas mixture. As a result of the exothermic reaction, a temperature increase in the ammonia oxidation catalyst (4), which is situated in the reaction zone (2), takes place. The hot product mixture enters through opening (13) behind the ammonia oxidation catalyst (4) into a space (3), which is the exit zone. Subsequent to this space (3), the hot product gas is led into a gas turbine (not shown here) or one or more heat exchangers (not shown here) for the recovery of energy or for use of the process heat in another way.

In order to realize the thermal decoupling of the starting material supply side from the reaction zone (2), the ammonia oxidation catalyst (4) is employed in a sheath (14) manufactured from temperature-resistant thermally insulating material, for example from ceramic or quartz glass. Possible pre-ignition of the feed gas mixture is thereby suppressed. The ammonia oxidation catalyst (4) lays loosely in the sheath (14) here and rests on a supporting ring (15) and—in the case of a particulate catalyst (4)—a number of supporting beams (not shown) of temperature-resistant material, for example ceramic or quartz glass. The supporting ring (15) prevents possible gas bypass. The supporting beams, if installed, are designed such that they only obstruct an insignificant portion of the flow cross-section.

For support and for the protection of the sheath (14), this is encased with a metal sheath (16) of high temperature-resistant material. The lower end of the metal sheath (16) is provided with a lip (17), which supports the supporting beam or supporting ring (15) and thus indirectly also the catalyst (4). At the lower end of the metal sheath (16) is attached a grid (18), through which the product gas flows from the ammonia oxidation catalyst (4) into the space (3). The grid (18) serves for the mechanical stabilization of the metal sheath (16) and the support of any possible supporting beams. In the case where the ammonia oxidation catalyst (4) consists not only of one part, but is composed of a number of parts, the grid (18) serves to support the individual parts by means of the supporting beam. If the sheath (14) should break in an unforeseen manner, for example because of thermal stress, the metal sheath (16), lip (17) and grid (18) moreover prevent falling down of the sheath (14) and ammonia oxidation catalyst (4) into the space (3).

The sheath (14) and metal sheath (16) are connected to the pressure jacket (20) of the ammonia oxidation reactor using nuts and bolts (19). The pressure space is sealed outwardly by a pressure flange (23) attached to the container.

For catalyst exchange, the connecting piece (12) is removed by undoing the screw connections. Subsequently, the nuts and bolts (19) are removed and the metal and ceramic or quartz glass sheath (16, 14) along with the ammonia oxidation catalyst (4) are removed from the reactor. In order to minimize the plant downtime (also compared to a conventional ammonia oxidation reactor), a second unit consisting of metal and ceramic or quartz glass sheaths (16, 14) and new ammonia oxidation catalyst (4) prepared before the downtime can be installed in the reactor immediately.

In order to assist the ammonia oxidation reaction, if required, during start-up of operation, the ammonia oxidation catalyst (4) can be preheated or activated by means of an ignition lance (25). The ignition lance (25) consists of a thin pipe, through which hydrogen is led into the ammonia oxidation reactor, and of a device which can ignite the hydrogen flow at the open end of the ignition lance.

The inspection window (26) mounted in the manifold of the ammonia oxidation reactor serves for the control of the ignition process and the monitoring of the state of the ammonia oxidation catalyst (4) during operation. The control can be carried out manually by visual inspection or with the aid of appropriate measuring devices such as photometers.

In order to alleviate the temperature stress on the material of the wall of the pressure container in the space (3) after the ammonia oxidation catalyst (4), the wall is provided with floating tube cooling (27) attached to the inside. Water or another cooling medium flows through the tubing of the floating wall.

Example 7

Figure 7:
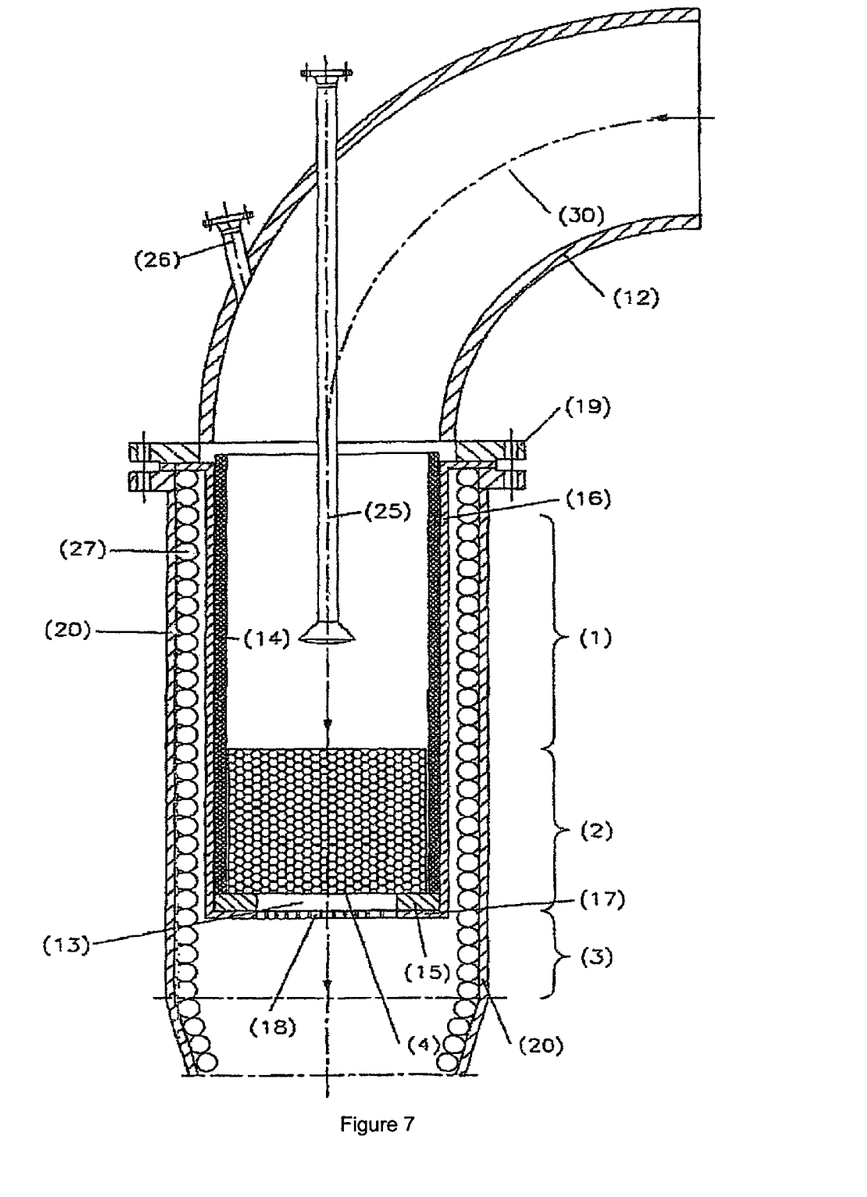
FIG. 7: A further device according to the invention in longitudinal section.

This embodiment of an ammonia oxidation reactor according to the invention shown in FIG. 7 is particularly well-suited for equipping new plants for the preparation of NO, as the necessity of an adjustment to the diameter of an already present heat recovery apparatus, such as, for example, of a steam boiler, is no longer afforded.

The principal difference to the reactor of Example 6 lies in the fact that the floating wall (27) hugs the metal sheath (16) and thus an adjustment to the generally larger diameter of an after-connected apparatus is not necessary. In this embodiment, the after-connected apparatus can be adapted to the ammonia oxidation reactor. As an alternative to the suspension of the metal sheath (16), the metal lip (17) provided for the support of the catalyst (4) can be attached directly to the floating wall (27), instead of to the metal sheath (16). This has a positive effect on the mechanical stability of the construction.

The other elements shown in FIG. 7 correspond to the elements of FIG. 6. They are an opening (13), supporting ring (15), grid (18), nuts and bolts (19), pressure jacket (20), ignition lance (25) and inspection window (26).

Example 8

Figure 8:
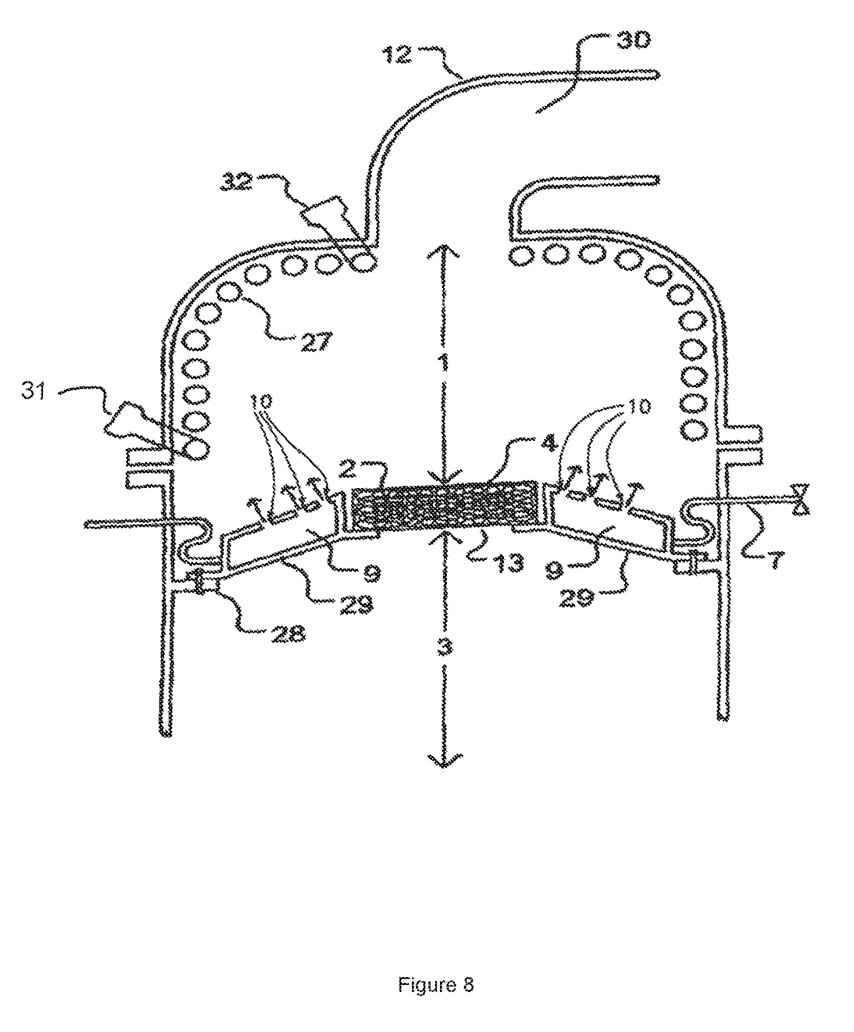
FIG. 8: A further device according to the invention in longitudinal section.

An ammonia oxidation reactor according to the invention is shown in FIG. 8. This embodiment is mainly suitable for equipping an existing conventional ammonia oxidation reactor with a new catalyst after removal of Pt/Rh gauzes.

An oxygen/ammonia/inert-containing mixture enters into the device according to the invention via the feed line (30). The mixture is led over an ammonia oxidation catalyst (4), which is provided here in honeycomb form or is situated on and/or in a honeycombed carrier. The ammonia is converted to nitrogen monoxide there by reaction with a part of the oxygen in the feed mixture. A temperature increase in the ammonia oxidation catalyst (4), which is situated in the reaction zone (2), takes place as a result of the exothermic reaction. The hot product mixture enters through opening (13) behind the ammonia oxidation catalyst (4) into a space, which is the exit zone (3). Following this space the hot product gas is passed into a gas turbine (not shown here) or one or more heat exchangers (not shown here) for the recovery of energy or for other use of the process heat.

The catalyst is accommodated in a high temperature-resistant support (29). This support (29) in turn lies gas-tight on a supporting ring (28) connected to the container wall.

In order to realize the necessary thermal decoupling of the starting material supply side from the reaction zone (2) and in this case also from the exit zone (3), the high temperature-resistant support (29), in which the ammonia oxidation catalyst (4) is accommodated, is equipped with one or more hollow spaces (9), through which a cooling medium fed into the inlets (7) flows. Here, the cooling medium used is compatible with the feed gas mixture, the reactions desired in the reactor, the catalyst (4) and the product gas mixture. For use in nitric acid plants, air, for example, can be employed as a suitable cooling medium. The cooling medium flows through the space(s) (9) in the support (29) and thereby cools the walls thereof on both sides. A thermal decoupling of the entry zone (1) from the reaction zone (2) and from the exit zone (3) is thereby realized, since the heat conduction from the reaction zone (2) along the support (29) into the entry zone (1) is suppressed by the cooling of the support (29). The cooling also suppresses the heat flow through the support (29) from the exit zone (3) into the entry zone (1).

The cooling medium enters into the entry zone (1) through a number of small openings (10) in the upper side of the support and mixes with the feed gas mixture.

By suitable choice of the distances between inlets (7) and openings (10) and by suitable choice of type, amount, flow rate and entry temperature of the cooling medium, the temperature on the side of the support (29) facing the entry zone (1) can be adjusted to be below the ignition or reaction temperature of the feed gas mixture, and undesired premature reactions are suppressed.

In order to adjust the temperature of the inner wall of the hood in the entry zone (1) to be below the ignition or reaction temperature of the feed gas mixture, the wall is provided with floating tube cooling (27) attached to the inside. Water or another cooling medium flows through the tubes of the floating wall, the cooling medium entering into the wall cooling via the inlet (31) and leaving the wall cooling via the outlet (32).

Comparison Examples 9a to 9c and Example 9d According to the Invention

In a test using transition metal oxide honeycomb catalysts for $NH_3$ oxidation, in which it was attempted, differing from the otherwise customary catalyst dimensioning, to focus the inflow on a low inflow area with comparatively great depth of the catalyst bed (5 cm), only low selectivity with respect to the $HNO_x$ formation was found in the experimental reactor under atmospheric conditions at a linear velocity of 1.0 m/s.

An increase in the linear velocity to 2.0 m/s also led only to an inadequate improvement of the $NO_x$ selectivity. The results are shown in the following table 1.

TABLE 1

| Example no. | Linear velocity | Space velocity | $NH_3$ turnover | $NH_3$ initial concentration | $NO_x$ selectivity | Reactor material |
|---|---|---|---|---|---|---|
| 9a | 1.0 m/s | 10,000 h$^{-1}$ | ~100% | 10% | 47% | Stainless steel |
| 9b | 2.0 m/s | 20,000 h$^{-1}$ | ~100% | 10% | 59% | Stainless steel |
| 9c | 1.0 m/s | 10,000 h$^{-1}$ | ~100% | 1% | 38% | Stainless steel |
| 9d | 1.0 m/s | 10,000 h$^{-1}$ | ~100% | 1% | 100% | Quartz glass |

Carrying Out the Experiments

A mixture of 10% or 1% ammonia in air flowed through a full honeycomb catalyst (200 csi, length 5 cm, diameter 1.8 cm) consisting of $LaCoO_3$ perovskite, which was employed in a tubular reactor of stainless steel or of quartz glass. The reactor tube was positioned in a tubular oven, with the aid of which possible heat losses were able to be compensated. The temperature adjustment was carried out by means of a thermocouple, which was arranged about 0.5 cm below the catalyst honeycomb (exit side). The exit temperature was uniformly 900° C.

The composition of the entering and exiting gas stream was investigated with the aid of an FTIR analyzer (Avatar model from Nicolet) with a gas cuvette.

The results shown in table 1 in experiments 9a to 9c can be explained in that a significant proportion of the $NH_3$ supplied was decomposed into $N_2$ and $H_2O$ before entry into the catalyst zone, as was confirmed by a corresponding experiment in an empty reactor tube. A complete conversion of $NH_3$, which essentially led to the formation of $N_2$ and $H_2O$, was recorded here at a linear velocity of 1.0 m/s in the reaction tube heated from outside even without the presence of the honeycomb catalyst.

If the experiment according to example 9c is carried out in a reactor made of quartz glass, which is a thermal insulator and at the same time is inert, it is surprisingly observed that the $NO_x$ selectivity is drastically increased (cf. example 9d according to the invention).

The invention claimed is:

1. A reactor for catalytic, exothermic gas phase reactions by conversion of a feed gas to a product gas comprising a housing having formed therein:
   an entry zone, devoid of fittings designed to generate turbulence for intermixing of gas passing therethrough, a reaction zone comprising at least one catalyst, and
an exit zone for the product gas,
wherein means comprising at least one feed line are provided for supplying a gas mixture to the entry zone as feed gas which is homogeneous with respect to its chemical composition, said gas mixture containing at least one oxidant and at least one component to be oxidized,
wherein, at least in the area of the entry zone, means are provided for forestalling undesired reactions in the entry zone, said means for forestalling undesired reactions comprising
means which decrease the transport of reaction heat generated in the reaction zone into the entry zone and
inert material lining at least a portion of the inner walls of the reactor either in the area of the entry zone or in the area of the reaction zone,
wherein the inert material is selected to be a material which does not promote any undesired side reactions at the temperatures prevailing in the feed gas in the entry zone and at the temperatures on the surfaces of the reactor inner wall, and
wherein the inert material is selected from the group consisting of ceramics, quartz glass, chamotte, enamel, and passivated metals.

2. The reactor of claim 1, wherein the entry zone is devoid of inert packings for mixing and dispersion of the homogeneous gas mixture.

3. The reactor of claim 1, wherein said at least one feed line is connected to one or more mixing units, upstream of said entry zone, for mixing the at least one oxidant and the at least one component to be oxidized.

4. The reactor of claim 1, wherein said means for forestalling undesired reactions in the entry zone comprises means for decreasing the transport of heat from the reaction zone into the entry zone provided both in the area of the entry zone and of the reaction zone.

5. The reactor of claim 1, wherein:
means which decrease the transport of heat produced in the reaction zone into the entry zone are provided in at least one of the area of the entry zone in the area of the reaction zone; and, wherein
the inner walls of the reactor are formed from inert material in at least one of the area of the entry zone or the area of the reaction zone.

6. The reactor of claim 1, wherein a reactor jacketing surrounds at least the reactor zone, and wherein, as means for decreasing the transport of heat produced in the reaction zone into the entry zone, at least one insulating jacket is provided that insulates the inner space of the reactor from the reactor jacketing in at least one of:
at the level of the entry zone; or
at the level of the entry zone and of the reaction zone; or
in the area of the entry zone and of the exit zone; or
in the area of the entry zone, of the reaction zone and of the exit zone.

7. The reactor of claim 6, wherein as means for decreasing the transport of heat produced in the reaction zone into the entry zone at least one device for passing a cooling medium through a conduit is provided adjacent at least one of:
the area of the entry zone; or
the area of the entry zone and of the reaction zone; or
the area of the entry zone and of the exit zone; or
the area of the entry zone, of the reaction zone and of the exit zone.

8. The reactor of claim 7, wherein the device for passing a cooling medium through a conduit is situated in the reactor jacketing or on the inner wall of the reactor jacketing.

9. The reactor of claim 1, further comprising:
a reactor jacketing supporting the catalyst, each of said entry zone, reaction zone and exit zone being surrounded by said reactor jacketing; and
an insulating jacket, supported by the reactor jacketing, that thermally insulates the inner space of the reactor from the reactor jacketing:
in the area at least of a part of the entry zone; or
in the area of the reaction zone and at least of a part of the entry zone;
said insulating jacket inhibiting the transmission of heat from the reaction zone to the feed gas in the entry zone.

10. The reactor of claim 9, wherein, said reactor jacketing has a double-wall, said reactor jacketing being adapted to support a carrier for the catalyst, and has at least one connection for introducing flow of a cooling medium between said double walls of said reactor jacketing.

11. The reactor of claim 1, further comprising:
a reactor jacketing having an inner wall and an outer wall over at least a portion of its extent, each of said entry zone, reaction zone and exit zone being surrounded by said reactor jacketing; and
wherein said reactor jacketing is double-walled:
at the level of the entry zone; or
at the level of the entry zone and the reaction zone; and
wherein a connection for introduction of a cooling medium into the space formed by the double-walled reactor jacketing is provided; said cooling medium cooling the inner wall of the reactor jacketing.

12. The reactor of claim 11, wherein at least one opening is provided in the inner wall of the double-walled reactor jacketing through which the cooling medium enters into the entry zone and mixes with the feed gas.

13. The reactor of claim 12, wherein the reactor is within a pressure vessel.

14. The reactor of claim 1, wherein a sheath formed from temperature-resistant and thermally insulating material is disposed within said reactor zone and wherein the catalyst is inserted into said sheath.

15. The reactor of claim 1, wherein the catalyst is chosen from the group consisting of:
a massive catalyst in the form of a honeycomb;
catalyst directly disposed on a honeycomb; and
catalyst dispersed on a support which is disposed on, in, or on and in a honeycomb.

16. The reactor of claim 15, wherein the catalyst contains at least 30% by weight of transition metal oxides.

17. The reactor of claim 1, wherein the catalyst is chosen from the group consisting of: poured beds of particulate catalyst; and packed beds of particulate catalysts;
in either case the catalyst bed having a depth of at least 3 cm in the flow direction.

18. A process for carrying out catalytic, exothermic gas phase reactions using the reactor of claim 1 comprising the steps of:
i) introduction of said at least one gas mixture which is homogeneous with respect to its chemical composition, and contains at least one oxidant and at least one component to be oxidized, as said feed gas through at least one feed line into the entry zone of said reactor,
ii) controlling the conditions under which the feed gas from the entry zone is supplied to the reaction zone comprising said catalyst such that the feed gas reacts in an exothermic reaction in the reaction zone to give the product gas, iii) leading the product gas through an exit zone (3) from the reactor, and iv) providing means comprising inert material for forestalling premature reaction in the entry zone of the reactor by decreasing the transport of reaction heat formed in the reaction zone into the entry zone; forming of the inner walls of the reactor from inert material over a regions extending over at least a portion of the entry zone or a portion of the reaction zone.

19. The reactor of claim 1, wherein the inert material is selected from the group consisting of a tightly sintered ceramic and a metal with passivated surfaces.

20. A process for carrying out catalytic, exothermic gas phase oxidations of ammonia in air comprising the steps of:

i) introducing a mixture of ammonia in air which is homogeneous with respect to its chemical composition as a feed gas through at least one feed line into the entry zone of a reactor, ii) controlling the conditions under which the feed gas from the entry zone is supplied to the reaction zone comprising at least one catalyst such that the feed gas reacts in an exothermic reaction in the reaction zone to produce a product gas stream comprising nitric oxide (NO), iii) leading the product gas through an exit zone from the reactor, and iv) providing means comprising inert material for forestalling premature reaction in the entry zone of the reactor by decreasing the transport of reaction heat formed in the reaction zone into the entry zone and forming the inner walls of the reactor from inert material over a region extending over at least a portion of the entry zone or a portion of the reaction zone, wherein the inert material is selected to be a material which does not promote any undesired side reactions at the temperatures prevailing in the feed gas in the entry zone and at the temperatures on the surfaces of the reactor inner wall, and wherein the inert material is selected from the group consisting of ceramics, quartz glass, chamotte, enamel, and passivated metals.

21. The process of claim 20, wherein the local concentrations of the oxidant and the gas to be oxidized in the feed gas have variation coefficients of less than or equal to 0.1, where the variation coefficient of the local concentrations of a substance expresses the ratio of the standard deviation of the local concentrations of the respective chemical substance to the mean value of the local concentrations of the substance.

22. The process of claim 20, wherein the feed gas used is an ammonia- and oxygen-containing gas mixture.

23. The process of claim 20, wherein the catalyst is a honeycomb catalyst.

24. The process of claim 23, wherein the catalyst contains at least 30% by weight of transition metal oxides.

25. The process of claim 23, wherein the catalyst comprises a granular catalyst or a catalyst packing having a depth of at least 3 cm in the flow direction.

* * * * *